United States Patent [19]

Smith et al.

[11] 4,431,682

[45] Feb. 14, 1984

[54] FROZEN AERATED CREAMY FROSTING AND METHOD THEREFORE

[75] Inventors: Gordon C. Smith, New City; Richard F. Hayes, Tarrytown; Carole G. Wendrovsky, Peekskill; Andre J. Eydt, New York, all of N.Y.

[73] Assignee: General Foods Corporation, White Plains, N.Y.

[21] Appl. No.: 388,767

[22] Filed: Jun. 15, 1982

[51] Int. Cl.³ .............................................. A23G 9/04
[52] U.S. Cl. ................................... 426/565; 426/572; 426/659
[58] Field of Search ............... 426/565, 572, 659, 566, 426/567

[56] References Cited

U.S. PATENT DOCUMENTS

| | | | |
|---|---|---|---|
| 3,431,117 | 3/1969 | Lorant | 99/139 |
| 3,464,830 | 9/1969 | Wahba | 426/572 |
| 3,520,698 | 7/1970 | Katz | 426/572 |
| 3,592,663 | 7/1971 | Brunner et al. | 99/139 |
| 3,649,302 | 3/1972 | Daggy et al. | 99/139 |
| 3,751,265 | 8/1973 | Seiden | 99/139 |
| 3,914,453 | 10/1975 | Gawrilow | 426/572 |
| 4,146,652 | 3/1979 | Kahn et al. | 426/564 |
| 4,232,049 | 10/1980 | Blake | 426/572 |

*Primary Examiner*—Jeanette M. Hunter
*Attorney, Agent, or Firm*—Thomas R. Savoie; Daniel J. Donovan

[57] ABSTRACT

A frozen, aerated cake frosting is prepared by pasteurizing and homogenizing a blend of sweeteners, water, fat, protein, emulsifiers and stabilizers, cooling and tempering the resulting emulsion and then whipping the tempered emulsion. Thereafter the whipped emulsion is combined with powdered sucrose at a weight ratio of 0.2 to 0.4:1 and the blend is frozen. The protein component is desirably a sodium-calcium caseinate complex having a sodium to calcium ratio of 0.25 to 1.0:1.

6 Claims, No Drawings

FROZEN AERATED CREAMY FROSTING AND METHOD THEREFORE

BACKGROUND OF THE INVENTION

1. Field of the Invention

The present invention relates to frozen, aerated frosting compositions and to the method of producing the same. More particularly, the present invention relates to frosting compositions which are stable in the freezer over extended storage times and which soften and become ready-to-spread after about two hours at room temperature. The frosting composition of this invention possesses a quality at least equal to frostings made from scratch by a homemaker or baker and superior to canned ready-to-spread frostings.

Canned ready-to-spread frostings are known in the art but, as these products are stored at roomtemperature, they do not typically contain ingredients such as butter and various other ingredients which are unstable at these storage conditions. These canned frostings will typically contain chemical preservatives and antioxidants.

Frostings are well-known in the food art. Among the several types of frostings are creme icings, fluffy frostings, and aerated creamy frostings. Creme icings typically include sugar, shortenings, emulsifiers and water. Such icings exhibit a creamy mouthfeel due, in part, to the high levels of shortening employed. The organoleptic properties of the icings, an example of which is disclosed in U.S. Pat. No. 3,464,830 to Walba, also importantly depend on physical properties such as a density typically exceeding 1.1 g/cc, which is indicatavie of low aeration. Fluffy frostings such as illustrated in U.S. Pat. No. 3,592,663 to Bruner et al. are highly aerated edible toppings typically having densities of less than about 0.4 g/cc. Fluffy frosting compositions are generally fat-free, depend on the whippability of proteins or certain polyglycerol esters of higher fatty acids, and normally include sugar, water and foam stabilizers. Aerated creamy frostings are disclosed in U.S. Pat. No. 3,649,302 to Daggy et al. and U.S. Pat. No. 3,751,265 to Seiden; however, such products have not been made commercially available as ready-to-spread frostings, presumably, as noted in the description of the prior art in U.S. Pat. No. 4,232,045 to Blake, due to their instability over time. U.S. Pat. No. 4,146,652 to Kahn et al. discloses (Example 1) a highly-aerated, cream frosting which remains soft at freezer conditions; however, The disclosed product which has a density of about 0.3 to 0.4 g/cc is percieved as a whipped topping rather than a frosting and if the Kahn et al. is whipped to a lesser extent, the resulting material does not have sufficient body to stay on the sides of a cake.

DISCLOSURE OF THE INVENTION

This invention relates to aerated, high-solids frozen emulsions which are resistant to collapse of their foam structure over a wide temperature range and resistant to syneresis through several freeze-thaw cycles. The frozen emulsions of this invention are suitable, after thawing, for use as ready-to-serve frostings after thawing. This invention also relates to the process for preparing these emulsions.

The aerated emulsions produced in accordance with this invention are stable at freezer conditions for periods in excess of one year, stable under refrigerated conditions for periods of at least a few weeks and stable at room temperatures of at least 85° F. for periods of two to three days. Thus these products are ideally suited for use as a frozen frosting which may be stored in a frozen state, such as during distribution and sale, for several months, stored in under refrigerated conditions, such as in a home refrigerator, for a week or two, and, finally be held at room temperature, such as on a frosted cake, for two to three days.

The aerated emulsions of this invention are formulated to be frozen (i.e. hard) at home freezer conditions (about 0° to 10° F. or −17.8° to −12.2° C.) but to thaw (i.e., become spreadable) within two-hours at room temperature. By virtue of this feature, it would be possible to maintain the frosting in a frozen state right up until the time the consumer begins preparation of a cake. During the time required to prepare, bake and cool the cake, the frozen frosting will thaw at room conditions.

In accordance with the present invention, a frozen, aerated frosting composition is prepared by blending a unique combination of fat, protein, emulsifiers, stabilizers, sweetening agents and water to form a mix; the mix is then pasteurized, homogenized, cooled, tempered, whipped, blended with a crystalline sugar such as powdered packed sucrose and then frozen. Crystalline sugar is added to the composition after whipping in order to provide the product with a slight grainy character comparable to that possessed by home-made frostings. This additional sucrose serves additional important functions of increasing the body, freeze-thaw stability, microbiological stability and stabilizing the viscosity of the frosting product. It has additionally been found that if this additional sugar were to be included in the initial blend then the product could develop a caramel flavor and the whipping step would require excessive work such that fat would be caused to churn out resulting in an excessively-soft frosting composition. It would also be possible to include other ingredients, such as heat sensitive flavors, into the whipped material along with the crystalline sugar.

The fat employed in preparing the frozen aerated frosting composition of this invention is primarily composed of hydrogenated vegetable oils such as those commonly employed in food products. Hydrogenated oils such as coconut oil, palm kernel oil, cottonseed oil, peanut oil, corn oil, soy bean oil and the like will be suitable. The fat should be a low-temperature melting fat having a bland taste and desirable melt-away characteristics at mouth temperatures. A combination of hydrogenated coconut oil and hydrogenated palm kernel oil has proven desirable for use in this invention. Desirably, an amount of butter or butter oil is included in the fat component of the composition to provide a desirable flavor impact. The fat component will typically comprise about 10–20% by weight of the frosting composition. Butter or butter oil will usually be present at a level of from 0.5 to 5% by weight of the composition.

The protein which is employed in this invention is present for its known functions of aiding aeration and also to provide body, texture and mouthfeel to the product. However in order to obtain a desirable body and texture together with the desired specific gravity of from 0.65 to 1.0, it has been found necessary to utilize a sodium—calcium caseinate complex as the protein whipping agent and to include this material in the frosting composition at a level of from 1.8 to 3% by weight. The ratio of sodium to calcium is from 0.25–1.0:1 and preferably is from 0.4-0.8:1. This ingredient is necessary in order to obtain a product which has sufficient body to be considered comparable to a home-made frosting and yet be readily spreadable. Highly-aerated frosting composition, such as those having a specific gravity of about 0.5 or below are perceived as whipped toppings rather than frostings. If sodium caseinate is used by itself at a level sufficient to achieve the desired body, then an excessive aeration occurs during whipping.

The sodium-calcium caseinate complex utilized in this invention will typically be prepared in the manner which is common for the production of caseinate salts. Thus, a combination of basic sodium and calcium compounds (e.g. sodium hydroxide and calcium bicarbonate) in an appropriate ratio, will be added to an acid casein dispersion and the resulting caseinate solution will be dried. The resulting coconverted caseinate salt will contain low amounts (on a weight basis) of both sodium and calcium in the macromolecular caseinate structure.

The emulsifier system for producing the frosting composition of this invention will be employed at a level of about 0.1 to 0.4% by weight and will contain a combination of a major amount of polyoxyethylene fatty acid esters of polyhydric alcohols, and a minor amount of a polyglycerol ester. This combination of emulsifiers has proven highly effective to control the body and texture of the frosting. Desirably the emulsifier system will also include a minor amount of a fatty acid ester of a polyhydric alcohol, such as sorbitan monostearate or propylene glycol monostearate.

The stabilizer system used in this invention is present at a level of from 0.05 to 0.2% by weight of the frosting. The stabilizer system includes a combination of at least two gums such as guar, locust bean, carragenan, cellulose, alginate, and the like. A combination of a major amount of xanthan gum and a minor amount of guar gum has proven to be preferred. Desirably the stabilizer system also includes a minor amount of a water-insoluble, cold-water swellable, micro-crystalline cellulose such as Avicel ® (a product of American Viscose Division of FMC Corporation, Marcus Hook, Pa.)

The sweetening agents employed in the frozen aerated frosting composition are chosen to provide the proper sweetness and body. Sweeteners, such as sucrose, dextrose, fructose, and hydrolyzed cereal syrups and solids, such as corn syrups and corn syrup solids, and mixtures of any of these may be utilized. The total level of sweetening agents present in the frosting formulation will be from about 42 to 60% by weight. As previously noted, the sweetening agents are added at two separate stages in the process. Usually a major amount of the sweetening solids, typically about 25 to 35% by weight of the frosting formulation, will be added as part of the emulsion system. Usually a minor amount of the sweetening solids, typically about 12 to 30% by weight of the frosting formulation will be blended into the whipped emulsion. Sucrose is the preferred sweetening agent and will normally comprise in excess of 60% of the sweetening solids added to the emulsion. Utilizing the sweetening agent levels specified above, the frosting formulations can be prepared which have a water activity ($A_w$) of about 0.90 or below. Such products will possess sufficient microbiological stability to have extended life after removal from the freezer.

Other ingredients which may be included in the frozen, aerated frosting composition of this invention include synthetic or natural flavoring and color agents, vitamins, minerals and the like. Flavorants such as chocolate, cocoa, vanilla extract, fruit flavors, food acids, salt will be among the more common of these optional ingredients. As the frosting of this invention is formulated to possess sufficient stability, preservatives such as mono-, di- and polyhydric alcohols, chemical preservatives such as sorbic acid, sorbates and benzoates and antioxidants such as butylated hydroxy anisole and the like are not required.

Water is a component of the frosting formulation of this invention and is present in the product. Total solids level for the product is from 70 to 78% by weight. The solids present in the whipped emulsion component, that is before dry crystalline sugar is added to the whipped emulsion, will range from about 60% to 68%.

The process utilized in making the product of this invention comprises a unique combination of steps. Initially the dry emulsion ingredients are blended with the water component for a sufficient time to throughly hydrate the ingredients. Preferably blending is effected in a heated tank. The blend is then pasteurized. The pasteurized blend is next passed through a homogenizer. Although homogenization can be accomplished in one step, for best results, homogenization is carried out in two stages with the first step operating at a minimum of 4,000 psi., preferably about 8,000 psi. and the second step operating at a pressure of about 500 psi. During the homogenization step the fat is broken up into globules which become coated with protein and emulsifier materials. The resulting emulsion is then cooled to about 35° to 60° F. (1.1° to 15.5° C.) in order to solidify the fat and prevent the fat globules from coalescing. The emulsion is then tempered at 35° to 60° F. for at least 30 minutes, typically at least two hours, in order to let the fat crystallize prior to additional processing. The emulsion is next passed through a whipper for the incorporation air or an inert gas. Whipping is continued to increase viscosity and to produce a density of 0.5 to 0.9 g/cc Crystalline sugar, typically 10X sucrose (with 3% cornstarch added as a flow agent), is added to and throughly mixed with the whipped emulsion at a weight ratio of about 0.2-0.4:1. The mixing of the sugar with the whipped emulsion will increase the density to between about 0.65 and 1.0 g/cc. The resulting product is then packaged, frozen at −20° F. (−28.9° C.) or below and then stored in a frozen state through distribution and sale.

EXAMPLE

| Ingredient | Weight % |
|---|---|
| 10X confectioner's Sugar | 25.93 |
| Sucrose | 25.39 |
| Water | 23.41 |
| Hydrogenated Vegetable Oil | 14.51 |
| 42DE Corn Syrup (81% solids) | 4.53 |
| Sweet Butter | 2.18 |
| Sodium/Calcium Caseinate Salt* (sodium to calcium ratio 0.5:1) | 2.18 |
| Flavors and Color | 0.99 |
| Vanilla Extract | 0.54 |
| Polysorbate 60 | 0.13 |
| Xanthan Gum | 0.06 |
| Sorbitan Monostearate | 0.05 |
| Salt | 0.04 |
| Microcrystalline Cellulose | 0.04 |
| Guar Gum | 0.02 |

-continued

| Ingredient | Weight % |
| --- | --- |
| Polyglycerol Esters | 0.01 |

*Alanate 230, available from New Zealand Milk Products, Inc. Petaluma, California.

PROCESS

Water and fat are blended in a tank at 160° F. The caseinate co-percipitate is then added to the tank. The emulsifier and gums are combined at 120° F. and then added to the tank followed by addition of the various flavor, color and sweetening ingredients. The blending is continued at 160° F. for at least 10 minutes in order to pasteurize the ingredients and the hot mix is passed through a 2-stage homogenizer with the first stage at 8,000 psi and the second stage at 500 psi. The resulting emulsion is then cooled to 40° F. and held at this temperature for 12 hours. The emulsion was then whipped for several minutes to obtain a density of 0.6 g/cc and the confectionary sugar component was slowly added to the whip and throughly mixed therewith resulting in a density of 0.68 g/cc. The material was then packaged in small bowls, statically frozen at −30° F. and stored at 0° F. The frozen, areated, vanilla frosting produced in accordance with the above procedure is stable for several months of frozen storage in that there is no collapse of foam structure, even through several freeze-thaw cycles. The material thawed to a spreadable consistency within two hours and provided an excellent frosting for a baked cake. The frosted cake was held at room temperature for three days at about 80° F. (26.7° C.) during which time it adhered well to both the top and sides of the cake and maintained a constant texture and flavor.

Having thus described the invention, what is claimed is:

1. A method for preparing an aerated, frozen, high-solids frosting composition containing sweeteners, water, fat, protein whipping agents, emulsifiers and stabilizers comprising the steps of:
   (a) heating and hydrating a blend of sweeteners, fat, protein whipping agent, emulsifiers and stabilizers for a sufficient time and at a sufficient temperature to pasteurize the blend, said blend having a solids content of from 60 to 68% by weight and said protein whipping agent being a sodium-calcium caseinate complex which is present at a level of from 1.8 to 3% by weight of the frosting composition;
   (b) homogenizing the blend at a pressure of at least 4000 psi in order to form a stable emulsion;
   (c) cooling the emulsion to between 35° and 60° F. and holding the emulsion within said temperature range for a period of at least 30 minutes;
   (d) whipping the emulsion to an overrun of between 50 and 70%;
   (e) blending crystalline sugar with the whipped emulsion at a weight ratio of from about 0.2–0.4:1 in order to produce a frosting composition having a solids content of from 70 to 78% by weight; and
   (f) freezing the said frosting composition.

2. The method of claim 1 wherein the sodium-calcium caseinate complex contains a ratio of sodium to calcium of 0.25 to 1.0:1.

3. The method of claim 2 wherein the sodium-calcium caseinate complex is prepared via co-conversion of acid casein.

4. The method of claim 1 wherein the emulsion is tempered for at least two hours.

5. The method of claim 1 wherein the frosting has a density of from 0.65–1.0 g/cc.

6. The method of claim 1 wherein crystalline sugar is powdered sucrose.

* * * * *